Patented July 10, 1928.

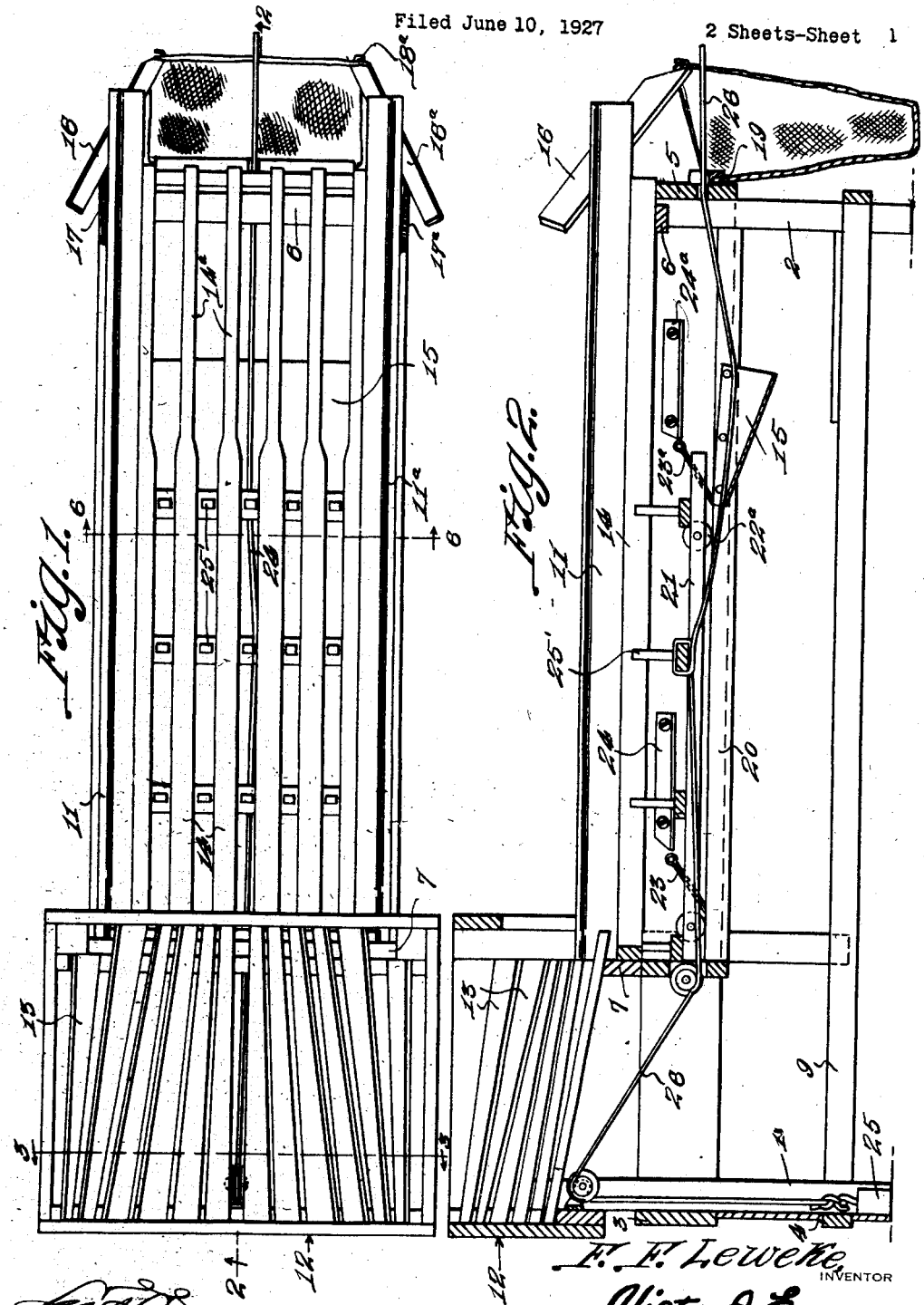

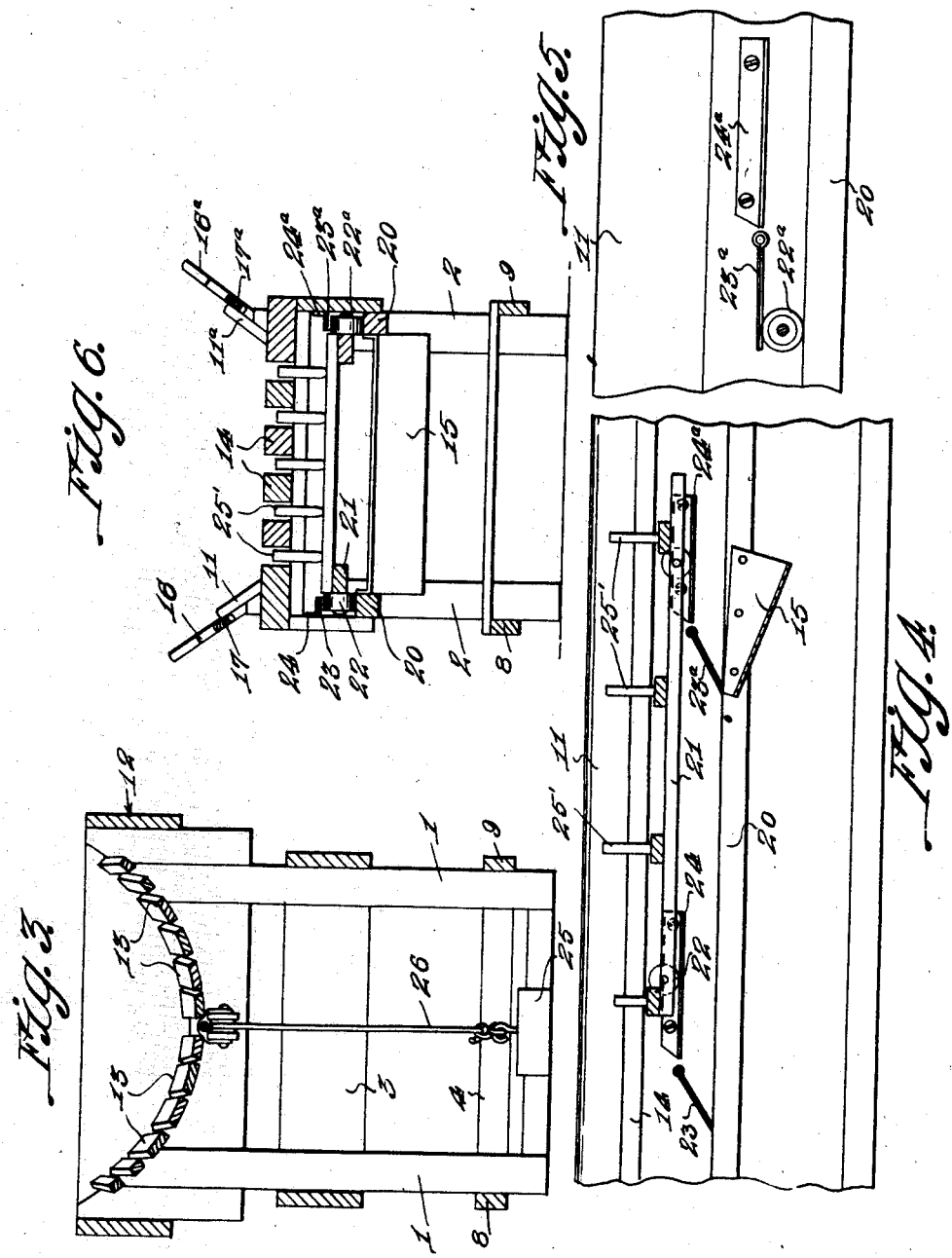

1,677,037

UNITED STATES PATENT OFFICE.

FRED F. LEWEKE, OF ROCKY FORD, COLORADO; EVA LEWEKE ADMINISTRATRIX OF SAID FRED F. LEWEKE, DECEASED.

FRUIT-GRADING MACHINE.

Application filed June 10, 1927. Serial No. 197,923.

This invention relates to a riddle for grading vegetables, the object being to provide a hand-operated apparatus of cheap and simple construction which will rapidly and accurately grade different size vegetables, such as potatoes, onions and the like.

In carrying out the invention I provide a wooden framework of rectangular parallelepipedon form formed of wooden timbers of suitable size nailed or screwed together and having at one end a concave inclined hopper on which the vegetables may be dumped to which they roll by gravity to a slatted framework formed of a plurality of spaced wooden slats, the separating distance of which varies toward the delivery end and through which the smaller grades of fruit may be delivered to suitable receptacles beneath the machine, the fruit being kept in motion by a hand-operated framework carrying at transverse points a plurality of flexible vertical fingers which translate the vegetables and agitate them, thereby causing the several grades to separate and deliver the final select grade for packing at the end of the machine in suitable bags or shipping containers. In some kinds of vegetables it is desirable to exercise great care so that the outside is not bruised to preserve them in good shipping condition, and to this end I provide the separating element of my riddle with vertical fingers of soft pliable material such as strips of sole leather and mount the framework carrying these transverse agitators on a sliding frame projecting through the slatted frame conveying the vegetables, providing a flexible handle in front such as a rope and a rope in the rear of the frame passing over a pulley attached to a weight, thereby providing a convenient reciprocating movement conveniently operated by a single workman to carry out the grading process. At the delivery end is provided a pair of spring controlled levers carrying hooks upon which a bag to transport the vegetables may be mounted at one end, and the rear end of the same being carried by a support on the slatted framework. In order to provide a satisfactory movement for the agitating device I provide a series of horizontal guides on which it may slide, these guides being supported a sufficient distance above the bottom of the apparatus so that in receiving a forward movement the pins will be translated longitudinally of the slats and rake the vegetables forward and after translating them a determinate distance will drop from the guides to a lower level, thereby being drawn back of the counterweight through a pair of pivoted inclines so that on the next forward movement the level of the flexible pins will be raised to intercept the bed of vegetables and give them a further forward movement and agitation.

My invention therefore comprises a riddle for grading vegetables comprising an inclined hopper, a slatted horizontal grading bed, guides for the several grades of vegetables, and a reciprocable hand-operated frame carrying a plurality of flexible fingers given a horizontal and intermittent horizontal motion and reciprocable longitudinally above and below the level of the slatted support. It embodies more specific features, the novelty of which will be hereinafter described and will be definitely indicated in the appended claims.

In the drawings illustrating the invention:

Figure 1 is a plan of an apparatus embodying my improvements.

Figure 2 is a side elevation of the same.

Figure 3 is a sectional view of the hopper end on the plane $a$—$b$ of Figure 1.

Figure 4 is an elevation showing an alternative position of the raking frame.

Figure 5 is a view of the raking frame in one stage of its movement.

Figure 6 is a section on the transverse plane $b$—$c$ of Figure 1 across the riddle.

Referring now in detail to the drawings, I provide a rectangular framework of vertical wooden posts 1, 2, etc., stiffened by cross bars 3, 4, 5 at the ends and transverse bars 6, 7, 8, 9, etc., to form a light portable framework to constitute a main frame for the riddle. A pair of inclined side walls 11, 11$^a$ form a chute or trough along which the vegetables to be graded may traverse. At the forward end is provided a rectangular inclined hopper 12 provided with a slatted crib formed of a series of inclined separated slats 13 on which the vegetables may be dumped. The bottom end of this hopper communicates with a slatted framework 14 running longitudinally of the machine and forming a bed for conveying the vegetables, along which they are carried to the bottom end where the spaces between the several slats are increased to act as a grading floor for an intermediate size of vegetable, as indicated at 14ª. Below this space is provided an inclined chute formed of thin metal as tin or a light wooden framework 15 and which forms a chute to a suitable receptacle placed below it. At the end of the slatted bed for the vegetables is a pair of pivoted bars 16, 16ª retracted by spiral springs 17, 17ª, the forward ends of which carry hooks 18, 18ª for a receptacle such as a bag to receive the prime size of the vegetables. The other side of the mouth of the bag may be supported on hooks, as 19, at the sides of the framework. On a pair of rails, as 20, I mount in sliding relation a carriage 21 carrying four rollers, as 22, 22ª, to roll along the rails 20. Pivoted in the sides of the framework on each side thereof is a pivoted metal plate 23 lying in the plane of the rollers 22 at each side of the slatted bed. The carriage is connected to a flexible cord or rope 24 to which is secured a counterweight 25 normally pulling it forward to the position indicated in Figure 2. A similar flexible cord 26 is connected at the rear end of the carriage and the operator by pulling on the same may shift the carriage to the rear and when released the weight automatically throws it forward to its normal position. When the operator pulls on the rope 26, the side rollers 22 engage the metallic inclines 23, 23ª, thus raising the carriage to the level of the guides 24, 24ª, along which it moves to the limit of the forward excursion of the frame.

During this time the series of transverse fingers 25 projecting through the slats are pulled to the rearward excursion of the carriage, thus raking the vegetables toward the end of the machine, and after reaching the limit of the movement the rollers drop from the brackets 24, 24ª and easing up of the rope permits the weight to pull the carriage to its rear limit of excursion. Thus by alternately pulling on the rope 26 the operator rakes the potatoes forward, when the smaller sizes drop through the widened slats at 14, 14ª, while the prime vegetables are automatically dropped into the receiving bag at the end of the machine.

It is apparent that one man may grade a considerable quantity of vegetables in a very short time by my improved grading riddle, and with two operators a very much greater quantity of material could be handled.

Having thus described my invention, what I claim as new and desire to secure by Letters Patent is:

1. A vegetable grader comprising a longitudinally slotted inclined hopper, a slatted riddle connected thereto having its slats varying in distance apart, a reciprocable wheeled carriage with flexible rake fingers traversing the slats below the riddle, and pivoted guides for lowering and raising the carriage at the limits of its excursions and flexible means for facilitating manual reciprocation of the carriage.

2. A grading riddle for vegetables such as potatoes, comprising a slatted hopper, a longitudinally slatted riddle connected therewith, a wheeled reciprocable carriage carrying a plurality of flexible fingers traversing the riddle, pivoted guides in the path of the carriage for raising the fingers to engage the vegetables on the outward excursion, a counter weight with a flexible connection to the carriage for retracting it and flexible means for drawing the carriage forward.

In testimony whereof I affix my signature.

FRED F. LEWEKE.